United States Patent
Hoffmann et al.

(10) Patent No.: US 11,653,423 B2
(45) Date of Patent: May 16, 2023

(54) INDUCTION COOKING HOB AND METHOD FOR CHECKING AN OPTIMAL POSITION OF A COOKING POT ON THE INDUCTION COOKING HOB

(71) Applicant: ELECTROLUX APPLIANCES AKTIEBOLAG, Stockholm (SE)

(72) Inventors: Harald Hoffmann, Rothenberg ob der Tauber (DE); Gerhard Klein, Rothenberg ob der Tauber (DE); Richard Turek, Rothenberg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 696 days.

(21) Appl. No.: 16/342,100

(22) PCT Filed: Oct. 9, 2017

(86) PCT No.: PCT/EP2017/075692
§ 371 (c)(1),
(2) Date: Apr. 15, 2019

(87) PCT Pub. No.: WO2018/073037
PCT Pub. Date: Apr. 26, 2018

(65) Prior Publication Data
US 2019/0254123 A1 Aug. 15, 2019

(30) Foreign Application Priority Data
Oct. 18, 2016 (EP) .................................. 16194326

(51) Int. Cl.
*H05B 6/06* (2006.01)
*H05B 6/12* (2006.01)
*H05B 6/10* (2006.01)

(52) U.S. Cl.
CPC .............. *H05B 6/101* (2013.01); *H05B 6/062* (2013.01); *H05B 6/1245* (2013.01); *H05B 2213/05* (2013.01)

(58) Field of Classification Search
CPC ........ H05B 6/062; H05B 6/44; H05B 6/1245; H05B 2213/05
See application file for complete search history.

(56) References Cited

U.S. PATENT DOCUMENTS 4,447,691 A * 5/1984 Mizukawa ............. H05B 6/062
219/626
4,511,781 A * 4/1985 Tucker .................. H05B 6/1272
219/626

(Continued)

FOREIGN PATENT DOCUMENTS

CN 102404890 4/2012
CN 105532073 4/2016

(Continued)

OTHER PUBLICATIONS

International Search Report and Written Opinion in PCT/EP2017/075692 dated Jan. 4, 2018, 10 pages.

(Continued)

*Primary Examiner* — Dana Ross
*Assistant Examiner* — Lawrence H Samuels
(74) *Attorney, Agent, or Firm* — Pearne & Gordon LLP

(57) ABSTRACT

The present invention relates to an induction cooking hob (10) comprising at least one cooking zone (12) including one induction coil (14). The induction cooking hob (10) comprises at least one user interface (22) including at least one display with at least one indicator corresponding with one cooking zone (12, 28, 30, 32). The induction coil (34, 36, 38, 40) is provided for detecting at least one parameter related to the power of the electromagnetic field generated by said induction coil (34, 36, 38, 40). The induction cooking hob (Continued)

Figure 1:
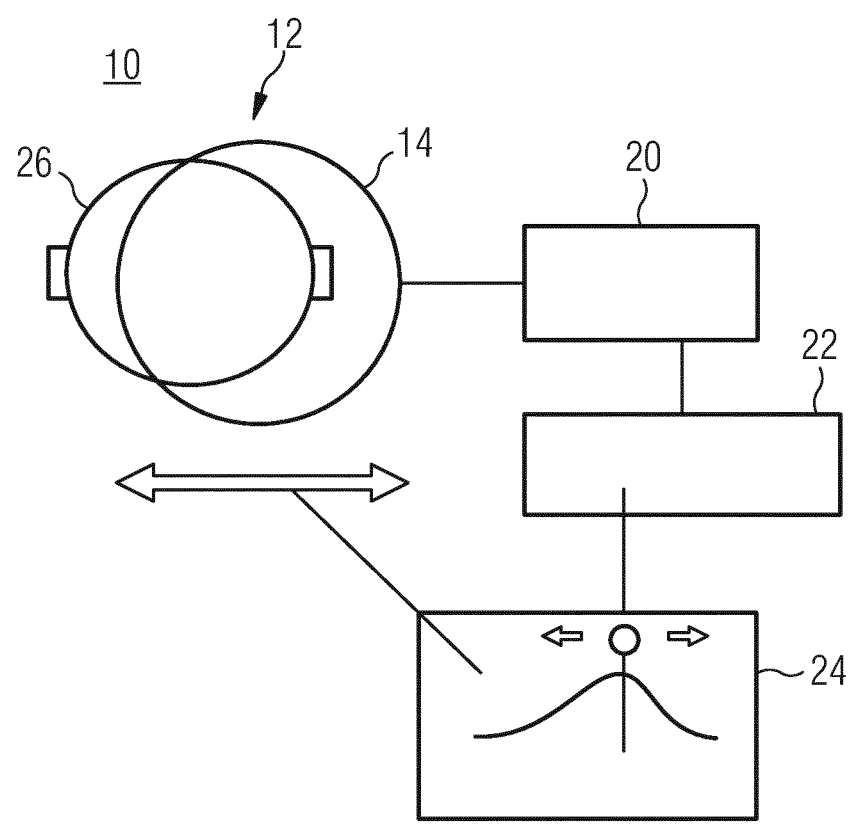

(10) comprises a memory for storing a maximum value of the parameter detected by the induction coil (14) of the cooking zone (12) when a cooking pot (26) is arranged upon said cooking zone (12). The indicator corresponding with the cooking zone (12) indicates a signal related to an incorrect position of the cooking pot (26), if the currently detected value of the parameter is lower than the maximum value of said parameter.

20 Claims, 3 Drawing Sheets

(56) References Cited

U.S. PATENT DOCUMENTS

| | | | | |
|---|---|---|---|---|
| 5,491,423 | A * | 2/1996 | Turetta | H05B 3/746 |
| | | | | 219/447.1 |
| 6,693,262 | B2 * | 2/2004 | Gerola | H05B 3/74 |
| | | | | 219/462.1 |
| 6,930,287 | B2 * | 8/2005 | Gerola | H05B 3/746 |
| | | | | 219/447.1 |
| 8,569,666 | B2 * | 10/2013 | Gutierrez | H05B 6/1254 |
| | | | | 219/626 |
| 9,155,130 | B2 * | 10/2015 | Shan | H05B 6/062 |
| 9,900,934 | B2 * | 2/2018 | Brasseur | H05B 6/1218 |
| 10,349,467 | B2 * | 7/2019 | Hoffmann | H05B 6/1209 |
| 10,555,382 | B2 * | 2/2020 | Leyh | H05B 6/1272 |
| 2001/0025848 | A1 * | 10/2001 | Cornec | H05B 6/1272 |
| | | | | 219/624 |
| 2010/0181304 | A1 * | 7/2010 | Gutierrez | H05B 6/1272 |
| | | | | 219/626 |
| 2012/0024835 | A1 * | 2/2012 | Artal Lahoz | H05B 6/065 |
| | | | | 219/385 |
| 2013/0248516 | A1 * | 9/2013 | Hoffmann | H05B 1/0266 |
| | | | | 219/626 |
| 2013/0320000 | A1 * | 12/2013 | Shan | H05B 6/062 |
| | | | | 219/620 |
| 2016/0050720 | A1 * | 2/2016 | Jeanneteau | F24C 7/083 |
| | | | | 219/445.1 |
| 2016/0242238 | A1 * | 8/2016 | Brasseur | H05B 6/062 |
| 2016/0330799 | A1 * | 11/2016 | Leyh | H01F 5/00 |
| 2018/0124879 | A1 * | 5/2018 | Puchinger | H05B 6/062 |

FOREIGN PATENT DOCUMENTS

| | | |
|---|---|---|
| CN | 105659696 | 6/2016 |
| CN | 106031302 | 10/2016 |
| EP | 0936843 | 8/1999 |
| EP | 2170010 | 3/2010 |
| EP | 2597929 A1 | 5/2013 |
| EP | 2632230 | 8/2013 |
| EP | 2706816 A1 | 3/2014 |
| EP | 2846607 A1 | 3/2015 |
| EP | 2876973 A1 | 5/2015 |
| EP | 2925088 A1 | 9/2015 |
| EP | 3035772 A1 | 6/2016 |
| EP | 3094159 | 11/2016 |
| WO | 2009090108 | 7/2009 |
| WO | 2013178799 | 12/2013 |

OTHER PUBLICATIONS

EP Communication for application No. EP 16194328.7, dated Jul. 15, 2020, 7 pages.
Chinese Office action for application No. CN 201780061548.9, dated Dec. 1, 2020, 23 pages.
Australian Office action for application No. 2017345017, dated Nov. 15, 2022, 4 pages.

* cited by examiner

INDUCTION COOKING HOB AND METHOD FOR CHECKING AN OPTIMAL POSITION OF A COOKING POT ON THE INDUCTION COOKING HOB

The present invention relates to an induction cooking hob. Further, the present invention relates to a method for checking an optimal position of a cooking pot on the induction cooking hob.

An induction cooking hob allows a flexible arrangement of the cooking zones and the cooking pot. However, the user often cannot recognize the ideal position of the cooking pot above the induction coil. For example, a cross or another symbol marks the centre of the cooking zone. When the cooking pot is placed above the cooking zone, then said cross or other symbol is covered by the cooking pot and hidden, so that the user cannot exactly centre the cooking pot above the cooking zone.

The wrong or inappropriate position of the cooking pot above the cooking zone may cause a suboptimal cooking process, e.g. an even browning of the foodstuff is avoided. Further, the wrong or inappropriate position of the cooking pot reduces the power transfer from the induction coil to said cooking pot. Moreover, the wrong or inappropriate position of the cooking pot may cause slow heat up times. Additionally, the wrong or inappropriate position of the cooking pot may cause a too high power transfer into critical areas of the cooking pot, for example into the side walls of the cooking pot, resulting in damages.

It is an object of the present invention to provide an induction cooking hob and a method, which allow a clear indication to the user, if the position of the cooking pot is correct or if the cooking pot has to be displaced upon the cooking zone.

The object is achieved by the induction cooking hob according to claim 1.

According to the present invention an induction cooking hob comprising at least one cooking zone including one induction coil, wherein:
- the induction cooking hob comprises at least one user interface including at least one display,
- the display includes at least one indicator corresponding with one cooking zone,
- the induction coil is provided for detecting at least one parameter related to the power of the electromagnetic field generated by said induction coil,
- the induction cooking hob comprises a memory for storing a maximum value of the parameter detected by the induction coil of the cooking zone when a cooking pot is arranged upon said cooking zone, and
- the indicator corresponding with the cooking zone indicates a signal related to an incorrect position of the cooking pot, if the currently detected value of the parameter is lower than the maximum value of said parameter.

The core of the present invention is that the at least one parameter related to the power of the electromagnetic field generated by the induction coil is detected and compared in order to check the optimal position of the cooking pot upon the cooking zone. The detected values of the cooking zone having one induction coil are compared with the stored maximum value.

Preferably, the indicator corresponding with the cooking zone may indicate a signal related to an optimal position of the cooking pot, if a currently detected value of the parameter is equal to the maximum value of said parameter.

Further, the induction cooking hob may comprise at least one further cooking zone including two or more induction coils, wherein the indicator corresponding with the further cooking zone indicates a signal related to a direction, in which the cooking pot has to be displaced, if the current values of the parameters detected by the induction coils of the further cooking zone are different from each other. The detected values of the cooking zones having two or more induction coils are compared with each other, wherein the direction, in which the cooking pot has to be displaced, is indicated.

Moreover, the indicator corresponding with the further cooking zone may indicate a signal related to the optimal position of the cooking pot, if the current values of the parameters detected by the induction coils of the further cooking zone are equal to each other.

Preferably, the indicator corresponding with the at least one further cooking zone includes at least two direction signs for indicating the direction, in which the cooking pot has to be displaced, if the current values of the parameters detected by the induction coils of the further cooking zone are different from each other, wherein preferably the direction signs are flashing signals and/or represented by arrows.

In particular, the indicator corresponding with the at least one further cooking zone includes an okay sign for indicating the optimal position of the cooking pot, if the current values of the parameters detected by the induction coils of the further cooking zone are equal to each other.

For example, the indicator corresponding with the cooking zone indicates a flashing signal related to the wrong position of the cooking pot, if the currently detected value of the parameter is lower than the maximum value of said parameter.

Further, the user interface may include a device for generating at least one acoustic signal, wherein said acoustic signal indicates the wrong position of the cooking pot on the cooking zone and/or that the cooking pot on the further cooking zone has to be displaced.

Preferably, the parameter related to the power of the electromagnetic field is a current through the induction coil.

Moreover, the parameter related to the power of the electromagnetic field may be a phase difference between the current through the induction coil and a voltage at said induction coil.

For example, the induction coils may be circular, elliptical, rectangular and/or triangular.

Further, the present invention relates to a method for checking an optimal position of a cooking pot upon the cooking zone of the induction cooking hob mentioned above, wherein said method includes the following steps:
a) repeated detecting the parameter relating to the power of the electromagnetic field generated by the induction coil of the cooking zone when the cooking pot on said cooking zone is arranged at different positions,
b) storing the maximum value of the parameter detected by the induction coil of the cooking zone,
c) detecting the current parameter related to the power of the electromagnetic field generated by the induction coil of the cooking zone when the cooking pot is arranged on said cooking zone,
d) comparing the maximum value and the currently detected value of the parameter, and
e) indicating a signal related to the incorrect position of the cooking pot, if the currently detected value is lower than the maximum value of the parameter.

Additionally, the method may include the further step of indicating a signal related to the optimal position of the cooking pot, if the currently detected value is equal to the maximum value of the parameter.

In particular, a flashing signal and/or an acoustic signal related to the wrong position of the cooking pot on the cooking zone is indicated, if the currently detected value of the parameter is lower than the maximum value of said parameter, while preferably a continuous lighting related to the optimal position of the cooking pot on the cooking zone is indicated, if the currently detected value of the parameter is equal to the maximum value of said parameter.

Moreover, the present invention relates to a method for checking an optimal position of the cooking pot upon the further cooking zone of the induction cooking hob mentioned above, wherein said method includes the following steps:
   a) detecting the parameters relating to the powers of the electromagnetic fields generated by the two or more induction coils of the further cooking zone,
   b) comparing the values of the parameters detected by the different induction coils, and
   c) indicating a signal related to the direction, in which the cooking pot has to be displaced, if the current values of the parameters detected by the induction coils of the further cooking zone are different from each other.

Preferably, the direction, in which the cooking pot has to be displaced, extends from the induction coil corresponding with a higher value to the induction coil corresponding with a lower value of the parameter.

Additionally, the method may include the further step of indicating a signal related to the optimal position of the cooking pot, if the values of the parameters detected by the induction coils are equal to each other.

For example, the direction, in which the cooking pot has to be displaced, is indicated by at least two direction signs, if the current values of the parameters detected by the induction coils of the further cooking zone are different from each other, wherein preferably the direction signs are flashing signals and/or represented by arrows.

Preferably, an okay sign for the further cooking zone is indicated, if the current values of the parameters detected by the induction coils of the further cooking zone are equal to each other.

For example, the parameter related to the power of the electromagnetic field is a current through the induction coil.

Moreover, the parameter related to the power of the electromagnetic field is a phase difference between the current through the induction coil and a voltage at said induction coil.

Novel and inventive features of the present invention are set forth in the appended claims.

Figure 2:
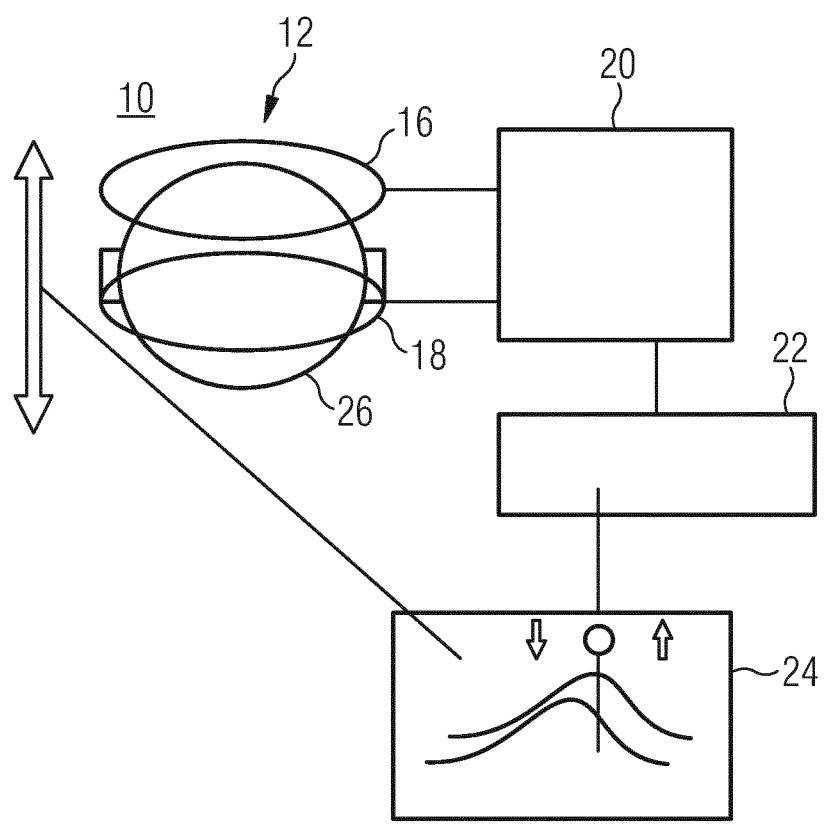
Figure 3:
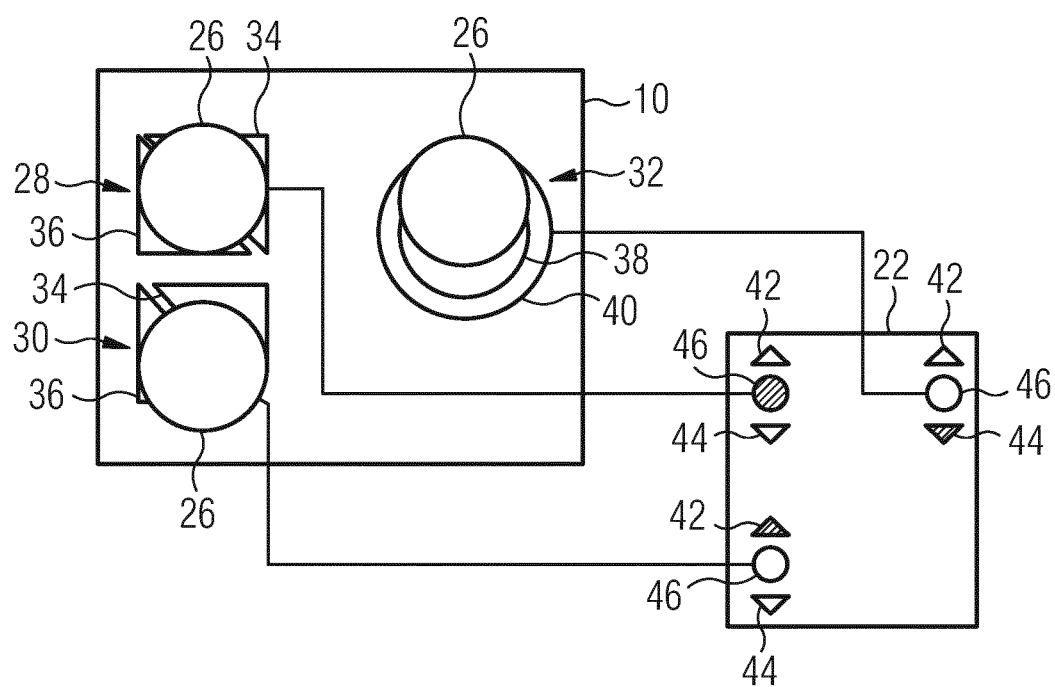

The present invention will be described in further detail with reference to the drawing, in which FIG. 1 illustrates a schematic top view of a cooking zone of an induction cooking hob according to a first embodiment of the present invention, FIG. 2 illustrates a schematic top view of the cooking zone of the induction cooking hob according to a second embodiment of the present invention, and FIG. 3 illustrates a schematic top view of the induction cooking hob with a user interface according to a third embodiment of the present invention.

FIG. 1 illustrates a schematic top view of a cooking zone 12 of an induction cooking hob 10 according to a first embodiment of the present invention.

In this embodiment, the cooking zone 12 comprises one induction coil 14. The induction coil 14 is connected to a power module 20. In turn, the power module 20 is connected to a user interface 22. Said user interface 22 includes at least one display. A cooking pot 26 is arranged on the cooking zone 12. In FIG. 1 the circular cooking pot 26 is displaced in relation to the induction coil 14. In this example, the induction coil 14 is also circular.

The induction coil 14 detects the cooking pot 26. At least one parameter of the induction coil 14 depends on the coverage of said induction coil 14 by the cooking pot 26. When the cooking pot is moved upon the cooking zone 12, then the parameter of the induction coil 14 is changed. The maximum value of the parameter is stored in a memory of a control unit of the induction cooking hob 10. Said maximum value of the parameter corresponds with the optimal position of the cooking pot 26 on the induction coil 14.

Since the circular cooking pot 26 is displaced in relation to the induction coil 14 in FIG. 1, the current value of the parameter of the induction coil 14 is lower than the maximum value of said parameter. In this situation, an indicator of the display of the user interface 22 indicates that the cooking pot 26 is not in the optimal position by an optical and/or acoustic signal. Else, the indicator of the display of the user interface 22 indicates that the cooking pot 26 is in the optimal position. A picture 24 in FIG. 1 represents a diagram of the correlation between the position of the cooking hob 26 and the parameter detected by the induction coil 14.

For example, the parameter may be the power of the electromagnetic field of the induction coil 14. The power of the electromagnetic field of the induction coil 14 is maximal, if the cooking pot 26 is in the optimal position upon the induction coil 14. In contrast, the power of the electromagnetic field of the induction coil 14 decreases, if the position of the cooking pot 26 deviates from said optimal position. The detection of the power of the electromagnetic field of the induction coil 14 provides information about the deviation of the cooking pot 26 from the optimal position.

Further, any other parameter correlating with the power of the electromagnetic field of the induction coil 14 may be detected in order to check the optimal position of the cooking pot 26 or to determine the deviation of said cooking pot 26 from the optimal position. For example, the parameter may be a current through the induction coil 14. Moreover, the parameter may be a phase difference between the current through the induction coil 14 and a voltage at said induction coil 14. Another parameter may be the frequency change of the current through the induction coil 14. Also the frequency change of the voltage at the induction coil 14 may be a suitable parameter. These frequency changes may occur during a displacement of the cooking pot 26 above the induction coil 14. The parameters mentioned above are detectable by components, which are already available in the induction cooking hob 10.

FIG. 2 illustrates a schematic top view of the cooking zone 12 of the induction cooking hob 10 according to a second embodiment of the present invention.

In this embodiment, the cooking zone 12 comprises a first induction coil 16 and a second induction coil 18. The first induction coil 16 and the second induction coil 18 are elliptical and arranged side-by-side, wherein the longitudinal axes of said induction coils 16 and 18 are parallel to each other. The first induction coil 16 and the second induction coil 18 are connected to the power module 20. In turn, the power module 20 is connected to the user interface 22 including at least one display. The cooking pot 26 is arranged upon the cooking zone 12. In FIG. 2 the cooking pot 26 is displaced in relation to the cooking zone 12, wherein the cooking pot 26 covers a smaller area of the first induction coil 16 and a bigger area of the second induction coil 18.

The first induction coil 16 and the second induction coil 18 detect the cooking pot 26. If the parameters detected by the first induction coil 16 and the second induction coil 18 would be equal to each other or at least similar, then the display of the user interface 22 would indicate that the cooking pot 26 is in the optimal position on the cooking zone 12.

However, since the cooking pot 26 is displaced in relation to the cooking zone 12 and covers the smaller area of the first induction coil 16 and the bigger area of the second induction coil 18 in FIG. 2, the current values of the parameters of the first induction coil 16 and the second induction coil 18 are different. In this situation, the display of the user interface 22 indicates that the cooking pot 26 has to be displaced in the direction to the first induction coil 16. The picture 24 in FIG. 2 represents two diagrams of the correlation between the position of the cooking hob 26 and the parameters detected by the first induction coil 16 and the second induction coil 18, respectively.

For example, the parameters detected by the first induction coil 16 and the second induction coil 18 may be the power of the electromagnetic field of said first induction coil 16 and second induction coil 18, the currents through the first induction coil 16 and the second induction coil 18, or the phase difference between the currents through the first induction coil 16 and the second induction coil 18 on the one hand and the voltage at said first induction coil 16 and second induction coil 18, respectively, on the other hand. Further parameters may be the frequency changes of the currents through the first induction coil 16 and the second induction coil 18, or the frequency changes of the voltages at the first induction coil 16 and the second induction coil 18. These frequency changes may occur during a displacement of the cooking pot 26 above the first induction coil 16 and the second induction coil 18. The parameters mentioned above are detectable by components, which are already available in the induction cooking hob 10.

FIG. 3 illustrates a schematic top view of the induction cooking hob 10 with a user interface 22 according to a third embodiment of the present invention.

In this embodiment, the induction cooking hob 10 comprises three cooking zones 28, 30 and 32. A first cooking zone 28 includes a first triangular induction coil 34 and a second triangular induction coil 36. A second cooking zone 28 includes also a first triangular induction coil 34 and a second triangular induction coil 36. The first triangular induction coil 34 and the second triangular induction coil 36 form a rectangular cooking zone 28 and 30, respectively, in each case. A third cooking zone 32 includes an inner induction coil 38 and an outer induction coil 40.

The cooking pot 26 arranged on the first cooking zone 28 is in the optimal position. In contrast, the cooking pot 26 arranged on the second cooking zone 30 is deviated from the optimal position, wherein the cooking pot 26 covers a smaller portion of the first triangular induction coil 34 and a bigger portion of the second triangular induction coil 36. Also the cooking pot 26 arranged on the third cooking zone 32 is deviated from the optimal position.

The display of the user interface 22 comprises three indicators. Each indicator corresponds with one of the cooking zones 28, 30 and 32. Further, each indicator includes a first direction sign 42, a second direction sign 44 and an okay sign 46. In this example, the first direction sign 42 and the second direction sign 44 are represented as arrows.

On the indicator corresponding with the first cooking zone 28 the first direction sign 42 and the second direction sign 44 are deactivated, while the okay sign 46 is activated, since the cooking pot 26 arranged on the first cooking zone 28 is in the optimal position. In this case, the values of the parameters detected by the first triangular induction coil 34 and the second triangular induction coil 36 are equal to each other or similar.

On the indicator corresponding with the second cooking zone 30 the first direction sign 42 is activated, while the second direction sign 44 and the okay sign 46 are deactivated, since the cooking pot 26 arranged on the second cooking zone 30 is deviated from the optimal position. The cooking pot 26 covers the smaller portion of the first triangular induction coil 34 and the bigger portion of the second triangular induction coil 36. Thus, the value of the parameter detected by the second triangular induction coil 36 is higher than the value of the parameter detected by the first triangular induction coil 34 of the second cooking zone 30.

On the indicator corresponding with the third cooking zone 32 the second direction sign 44 is activated, while the first direction sign 42 and the okay sign 46 are deactivated, since the cooking pot 26 arranged on the third cooking zone 32 is deviated from the optimal position.

The first direction sign 42, the second direction sign 44 and/or the okay sign 46 indicate clearly to the user, in which direction the cooking pot 26 has to be displaced. The detection of parameter values of two or more induction coils allows the determination of the displacement direction.

Although illustrative embodiments of the present invention have been described herein with reference to the accompanying drawings, it is to be understood that the present invention is not limited to those precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 induction cooking hob
12 cooking zone
14 induction coil
16 first induction coil
18 second induction coil
20 power module
22 user interface
24 picture
26 cooking pot
28 first cooking zone
30 second cooking zone
32 third cooking zone
34 first triangular induction coil
36 second triangular induction coil
38 inner induction coil
40 outer induction coil
42 first directional sign
44 second directional sign
46 okay sign

The invention claimed is:
1. An induction cooking hob comprising a first cooking zone including one induction coil, and a second cooking zone including first and second induction coils, wherein:
the induction cooking hob comprises a user interface including a display,
the display includes a first indicator corresponding with said first cooking zone,
the induction coil of said first cooking zone is provided for detecting a parameter related to a power of an electromagnetic field generated by said induction coil,
the induction cooking hob comprises a memory for storing a maximum value of the parameter detected by the induction coil of the first cooking zone when a cooking pot is arranged upon said first cooking zone,
the first indicator corresponding with the first cooking zone indicates a signal related to an incorrect position of the cooking pot if a currently detected value of the parameter is lower than the maximum value of said parameter, and
the first and second induction coils of the second cooking zone are provided for detecting respective first and second parameters of said first and second induction coils related to respective electromagnetic fields generated thereby while in operation with a further cooking pot in said second cooking zone, wherein a second indicator corresponding with the second cooking zone indicates a signal related to a direction in which said further cooking pot in said second cooking zone has to be displaced if present values of the respective first and second parameters are different from each other, and wherein the second indicator corresponding with the second cooking zone indicates a signal related to an optimal position of the further cooking pot if the present values of the respective first and second parameters of the first and second induction coils of the second cooking zone are equal to each other.

2. The induction cooking hob according to claim 1, wherein the first indicator corresponding with the first cooking zone indicates a signal related to an optimal position of the cooking pot if the currently detected value of the parameter detected by the induction coil of the first cooking zone is equal to the maximum value thereof.

3. The induction cooking hob according to claim 1, wherein the second indicator corresponding with the second cooking zone includes at least two direction signs for indicating the direction in which the further cooking pot has to be displaced if the present values of the respective first and second parameters of the first and second induction coils of the second cooking zone are different from each other.

4. The induction cooking hob according to claim 1, wherein the signal related to an optimal position of the further cooking pot in the second cooking zone includes an okay sign.

5. The induction cooking hob according to claim 1, wherein the first indicator corresponding with the first cooking zone indicates a flashing signal related to a wrong position of the cooking pot if the currently detected value of the parameter detected by the induction coil of the first cooking zone is lower than the maximum value thereof.

6. The induction cooking hob according to claim 1, wherein the user interface includes a device for generating at least one acoustic signal indicating a wrong position of the cooking pot on the first cooking zone.

7. The induction cooking hob according to claim 1, wherein the parameter related to the power of the electromagnetic field generated by said induction coil of the first cooking zone is a current through the induction coil and/or a phase difference between the current through the induction coil and a voltage at said induction coil.

8. The induction cooking hob according to claim 1, wherein the induction coil of said first cooking zone is circular, elliptical, rectangular and/or triangular.

9. A method for checking an optimal position of the cooking pot above the first cooking zone of the induction cooking hob according to claim 1, wherein said method includes the following steps:
a) repeated detecting the parameter relating to the power of the electromagnetic field generated by the induction coil of the first cooking zone when the cooking pot on said first cooking zone is arranged at different positions,
b) storing the maximum value of the parameter detected by the induction coil of the first cooking zone,
c) detecting the current parameter related to the power of the electromagnetic field generated by the induction coil of the first cooking zone when the cooking pot is arranged on said first cooking zone,
d) comparing the maximum value and the currently detected value of the parameter detected by the induction coil of the first cooking zone, and
e) indicating a signal related to an incorrect position of the cooking pot if the currently detected value thereof is lower than the maximum value thereof.

10. The method according to claim 9, further comprising indicating a signal related to the optimal position of the cooking pot if the currently detected value is equal to the maximum value of the parameter detected by the induction coil of the first cooking zone.

11. The method according to claim 9, wherein the parameter related to the power of the electromagnetic field of the induction coil of the first cooking zone is a current through that induction coil and/or a phase difference between the current through that induction coil and a voltage at that induction coil.

12. The method according to claim 9, wherein a flashing signal and/or an acoustic signal related to the incorrect position of the cooking pot on the first cooking zone is indicated if the currently detected value of the parameter detected by the induction coil of the first cooking zone is lower than the maximum value thereof.

13. The method according to claim 12, wherein a continuous lighting related to the optimal position of the cooking pot on the first cooking zone is indicated if the currently detected value of the parameter related to the power of the electromagnetic field of the induction coil of the first cooking zone is equal to the maximum value thereof.

14. A method for checking an optimal position of the further cooking pot above the second cooking zone of the induction cooking hob according to claim 1, wherein said method includes the following steps:
a) detecting the respective first and second parameters relating to the respective electromagnetic fields generated by the first and second induction coils of the second cooking zone,
b) comparing the present values of the respective first and second parameters of the first and second induction coils of the second cooking zone, and
c) indicating the signal related to the direction in which the further cooking pot has to be displaced if the present values of the respective first and second parameters of the first and second induction coils of the second cooking zone are different from each other.

15. The method according to claim 14, wherein the direction in which the further cooking pot has to be displaced extends from one of the first and second induction coils of the second cooking zone corresponding with a higher value of the respective first and second parameters related thereto to another of the first and second induction coils of the second cooking zone corresponding with a lower value of the respective first and second parameters related thereto.

16. The method according to claim 14, wherein the method includes the further step of indicating a signal related to the optimal position of the further cooking pot if the present values of the respective first and second parameters detected by the first and second induction coils of the second cooking zone are equal to each other.

17. The method according to claim 14, wherein the direction in which the further cooking pot has to be displaced is indicated by at least two direction signs if the present values of the respective first and second parameters detected by the first and second induction coils of the second cooking zone are different from each other.

18. The method according to claim 14, wherein an okay sign for the second cooking zone is indicated if the present values of the respective first and second parameters detected by the first and second induction coils of the second cooking zone are equal to each other.

19. A method of detecting an optimal position of a pot on a cooking hob, the hob comprising a first cooking zone having an induction coil, a second cooking zone having first and second induction coils, a user interface comprising a display, and a controller operatively coupled to said induction coil of said first cooking zone, the first and second induction coils of said second cooking zone, and said user interface, the method comprising:
with respect to the first cooking zone:
detecting a parameter of said induction coil relating to a power of an electromagnetic field generated thereby while in operation with a cooking pot in said first cooking zone;
comparing the detected parameter with a predetermined maximum value for the parameter stored in a memory of said controller;
when said detected value is substantially equal to said predetermined maximum value, displaying a first indicator on said display associated with said first cooking zone,
to indicate that said cooking pot is in an optimal position in said first cooking zone;
when said detected value is not substantially equal to said predetermined maximum value, displaying a second indicator on said display associated with said first cooking zone, to indicate that said cooking pot is not in said optimal position in said first cooking zone; and with respect to the second cooking zone:
detecting respective first and second parameters of each of said first and second induction coils in said second cooking zone related to respective electromagnetic fields generated thereby while in operation with a further cooking pot in said second cooking zone;
comparing to one another the detected first and second parameters of said first and second induction coils in said second cooking zone;
when the detected first and second parameters of said first and second induction coils in the second cooking zone are substantially equal, displaying a first indicator on said display associated with said second cooking zone, to indicate that said further cooking pot is in an optimal position in said second cooking zone; and
when the detected first and second parameters of said first and second induction coils in the second cooking zone are not substantially equal, displaying a second indicator on said display associated with said second cooking zone, to indicate that said further cooking pot is not in the optimal position in said second cooking zone, said second indicator associated with said second cooking zone further indicating a direction in which said further cooking pot must be displaced with respect to said second cooking zone in order to approach said optimal position therein, said direction being generally from the first or second induction coil in the second cooking zone whose detected parameter is lower than the other, toward the other of said first or second induction coils in said second cooking zone.

20. An induction cooking hob comprising a cooking zone including first and second induction coils, a user interface including a display that includes an indicator corresponding with said cooking zone, the first induction coil being adapted for detecting a first parameter related to a power of an electromagnetic field generated by said first induction coil while in operation with a cooking pot, the second induction coil being adapted for detecting a second parameter related to a power of an electromagnetic field generated by said second induction coil while in operation with said cooking pot, wherein the indicator indicates a signal related to a direction in which said cooking pot has to be displaced if a present value of the first parameter and a present value of the second parameter differ from one another based on a comparison therebetween, and wherein the indicator indicates a signal related to an optimal position of the cooking pot if the present value of the first parameter and the present value of the second parameter are equal to each other.

* * * * *